US011687744B2

(12) United States Patent
Patwardhan et al.

(10) Patent No.: US 11,687,744 B2
(45) Date of Patent: *Jun. 27, 2023

(54) SHARED CONTROLLER FOR SYSTEM WITH MULTIPLE NFC READERS

(71) Applicant: Clover Network, LLC, Sunnyvale, CA (US)

(72) Inventors: Ketan Patwardhan, San Francisco, CA (US); Narayanan Gopalakrishnan, Newark, CA (US)

(73) Assignee: CLOVER NETWORK LLC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,199

(22) Filed: May 10, 2022

(65) Prior Publication Data

US 2022/0269871 A1 Aug. 25, 2022

Related U.S. Application Data

(63) Continuation of application No. 16/685,454, filed on Nov. 15, 2019, now Pat. No. 11,361,172.

(51) Int. Cl.
*G06K 7/10* (2006.01)
(52) U.S. Cl.
CPC ..... *G06K 7/10297* (2013.01); *G06K 7/10475* (2013.01)
(58) Field of Classification Search
CPC .............. G06K 7/10297; G06K 7/10475
See application file for complete search history.

(56) References Cited

U.S. PATENT DOCUMENTS

| 9,793,960 B2 | 10/2017 | Boehler et al. |
| 10,149,153 B2 | 12/2018 | Bernsen |

(Continued)

FOREIGN PATENT DOCUMENTS

| EP | 3454279 A1 | 3/2019 |
| GB | 2505867 A | 3/2014 |

OTHER PUBLICATIONS

Extended European Search Report dated Apr. 12, 2021, EP Patent Application No. 20207323.5, 8 pages.

(Continued)

*Primary Examiner* — Sonji N Johnson
(74) *Attorney, Agent, or Firm* — Foley & Lardner LLP

(57) ABSTRACT

This disclosure relates to systems with multiple NFC front ends and at least one shared controller. One disclosed system includes a first discrete device having a first near field communication (NFC) controller, a second discrete device having a second NFC controller, a communicative connection between the first discrete device and the second discrete device, and a system controller located on the first discrete device. The system controller is communicatively connected to the first NFC controller. The system controller is connected to the second NFC controller via the communicative connection. In specific approaches, the second discrete device can include a display which is also controlled by the system controller, and the system controller is NCI compliant and application aware. In specific approaches, the system controller can control the second NFC controller based on the content concurrently being provided to the display.

18 Claims, 5 Drawing Sheets

(56) References Cited

U.S. PATENT DOCUMENTS

| | | |
|---|---|---|
| 10,185,944 B2 | 1/2019 | Kim et al. |
| 11,361,172 B2 * | 6/2022 | Patwardhan ....... G06K 7/10475 |
| 2010/0048125 A1 | 2/2010 | Ohkita |
| 2012/0220220 A1 | 8/2012 | DeLuca et al. |
| 2014/0358796 A1 | 12/2014 | Smets et al. |
| 2015/0113185 A1 * | 4/2015 | Lee ........................ G06F 21/35 710/106 |
| 2015/0142589 A1 * | 5/2015 | Jin .................... G06Q 20/3278 705/18 |
| 2016/0277626 A1 * | 9/2016 | Sato .................... H04B 5/0031 |
| 2019/3039050 | 10/2019 | Sanchez-Llorens et al. |

OTHER PUBLICATIONS

Gravity: UART & I2C NFC Module, Product Sheet, viewed online Oct. 9, 2019, available at https://www.dfroboT.com/product-1905.html, 4 pages.

\* cited by examiner

US 11,687,744 B2

SHARED CONTROLLER FOR SYSTEM WITH MULTIPLE NFC READERS

CROSS-REFERENCE TO RELATED APPLICATION

This is a continuation of U.S. application Ser. No. 16/685,454, filed on Nov. 15, 2019, the entirety of which is incorporated by reference herein.

BACKGROUND

The term near field communication (NFC) refers to a type of communication that involves minute wireless data transfers between devices over limited distances. The technology is rooted in radio-frequency identification technology (RFID). NFC does not refer to a single communication specification as numerous incompatible platforms have been developed in the NFC space. These specifications include those developed by ISO/IEC, the NFC Forum, the GSMA Group, the EMV Company, and others. Furthermore, each NFC platform can include multiple modes of communication that are each individually practiced by separate devices. For example, one device could execute the NFC Forum Reader/Writer mode but not the NFC Forum Peer-to-Peer mode.

Point of sale (POS) devices can utilize NFC to obtain payment information from a purchaser. FIG. 1 illustrates a POS device 100 with an integrated NFC antenna 101. The POS device 100 also includes a printed circuit board 102 with an NFC controller 103 and a touch display controller 104. As illustrated, POS device 100 is displaying a prompt on display 105 indicating that the terminal is primed to receive payment information via NFC antenna 101. In response to such a prompt, a customer could transmit payment information to NFC antenna 101 by holding an NFC-enabled payment card 106, with an NFC antenna 107, above POS device 100.

SUMMARY

This disclosure relates to systems with multiple NFC front ends and at least one shared controller. As used herein, the term "NFC controller" is used to refer to a standard NFC front end while the term "controller" is used to refer to a system-level controller capable of serving as a host for an NFC front end. Furthermore, the combination of an NFC front end and an NFC antenna is referred to as an "NFC reader." In specific embodiments of the invention disclosed herein, a single controller on a first discrete device is capable of serving as a controller for a local NFC antenna, located on the same device as the controller, and a remote NFC antenna, located on a second discrete device. In specific embodiments of the invention disclosed herein, the single controller is also capable of controlling a local display on the first discrete device and a remote display on the second discrete device. In specific embodiments of the invention disclosed herein, the second device is a servant device, and does not include a controller, but provides a high degree of interactivity via its display and NFC reader, while keeping the cost and complexity of the second device low. Systems that utilize this approach express the benefit of a reduced bill of materials, because the overall system requires fewer expensive controllers or drivers, while maintaining the same level of functionality for the overall system. Specific technical approaches for implementing these systems are disclosed below.

Various combinations of devices and NFC readers can benefit from the approaches disclosed herein. For example, a main device and a peripheral device could each include their own NFC antennas, and share a single controller. The peripheral could be added to increase the number of NFC protocols the overall system is configured to operate with. For example, a first main device could be configured to communicate using the NFC Forum Reader/Writer specification while the peripheral device was configured to communicate using the EMVCo L1 NFC specification. Alternatively, the peripheral could be added to the system to increase the number of locations with available NFC readers. For example, the different devices could be placed in different locations for use by different users. A first device could be located on a gantry or control room for use by a manufacturing line supervisor while another device was located on a specific machine in the manufacturing line for use by a technician assigned to that specific machine. This configuration would allow both parties to log in for their shifts without having to first report to the same location.

In specific embodiments of the invention, the shared controller and multiple NFC readers are part of a POS system. The POS system can include multiple devices each with their own NFC reader. For example, a first terminal device and a peripheral device could each include NFC readers. The NFC reader on the peripheral could be configured to execute additional NFC protocols not capable of being executed by the terminal such that the peripheral expanded the utility of the system. The peripheral could also be configured to be operated by a single party to the transaction (e.g., a customer or merchant) while the terminal was configured to be operated by the counterparty to the transaction, where each device included an NFC reader. For example, a simple merchant-facing peripheral could include an NFC reader to allow a merchant-employee to log into and unlock the POS system for time tracking, auditing, and security purposes, while a connected customer-facing terminal could include an NFC reader to allow a customer to provide payment information to the POS system. As another example, a simple customer-facing peripheral could include an NFC reader to allow a customer to check in to a store loyalty program by scanning their phone, while a connected merchant-facing terminal could include an NFC reader to allow a merchant to provide payment information to the POS system. As another example, both the customer-facing and merchant-facing devices could each include multiple NFC readers (e.g., a first reader for insecure information such as employee login or store loyalty program information and a second reader for secure information such as payment information). In either situation, the combined cost and complexity of the system could be reduced by designing the devices to utilize the technical approaches disclosed herein and share a single controller located in the terminal.

In specific embodiments of the invention, a system is provided. The system includes a first discrete device having a first NFC controller, a second discrete device having a second NFC controller, a communicative connection between the first discrete device and the second discrete device, and a system controller located on the first discrete device. The system controller is communicatively connected to the first NFC controller and the second NFC controller via the communicative connection.

In specific embodiments of the invention, a device is provided. The device includes a first NFC controller, a communicative connection to a second discrete device, and a system controller. The system controller is programmed to control the first NFC controller and a second NFC controller on the second discrete device via the communicative connection.

In specific embodiments of the invention, a method is provided. The method includes providing a first discrete device having a first NFC controller and providing a second discrete device having a second NFC controller. The method also includes controlling the first NFC controller using a system controller located on the first discrete device. The method also includes controlling, using the system controller and a communicative connection between the first discrete device and the second discrete device, the second NFC controller.

DETAILED DESCRIPTION

Figure 1:
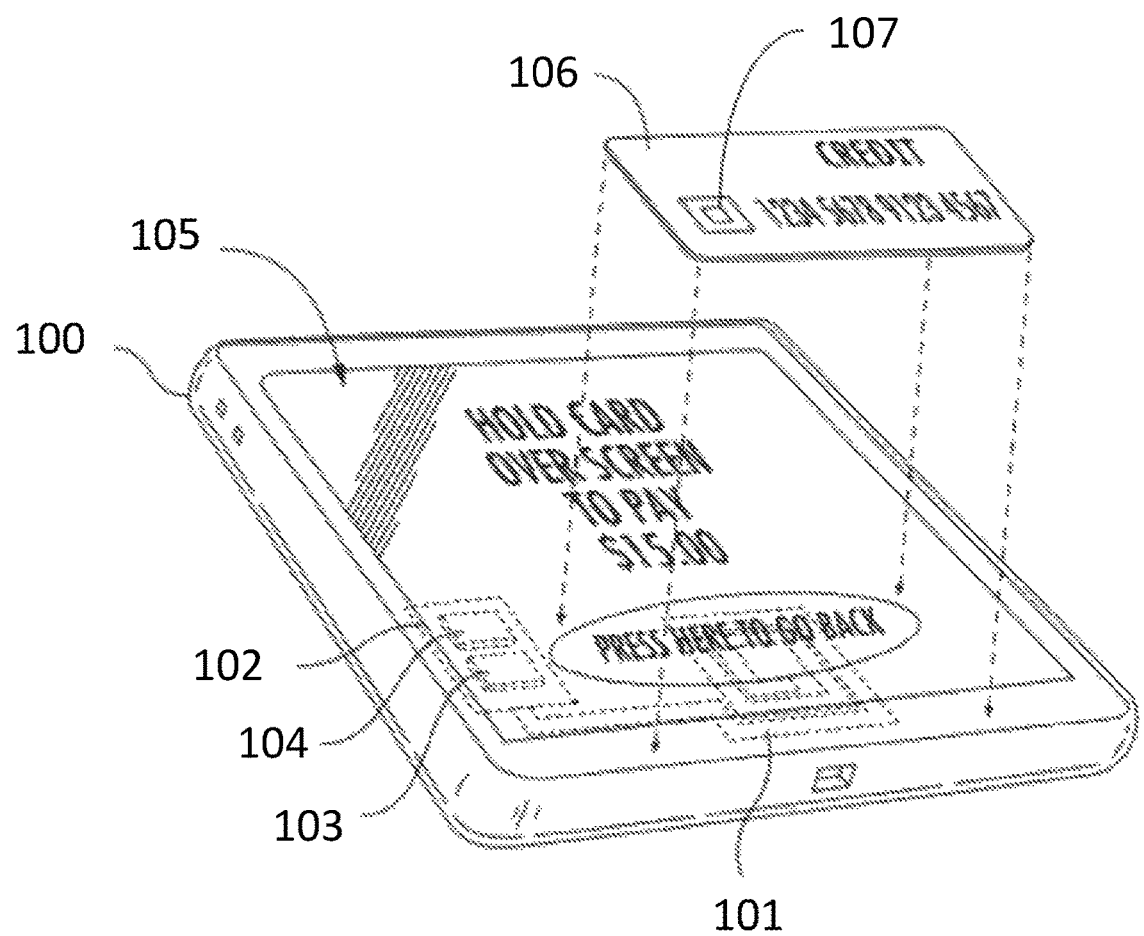
FIG. 1 illustrates a point of sale (POS) device with a near field communication (NFC) antenna communicating with an NFC tag in accordance with the related art.

Systems, and associated methods, with multiple near field communication (NFC) front ends and at least one shared controller are disclosed. An NFC front end receives signals from an antenna and conducts initial processing on the signals to condition them for use by a host system. Generally, an NFC front end includes an analog interface for connecting to an antenna (e.g., a modulator/demodulator, a phase locked loop, a filter, a transmitter, a receiver, an oscillator, an analog-to-digital converter, etc.), and a bus interface for connecting to a host (e.g., a USB, UART, SPI, MIPI, PCIE, or $I^2C$ interface). One example of a host is a system controller such as an applications processor or dedicated ASIC used to provide an operating system and control multiple devices in addition to the NFC front end. An NFC front end can be implemented in a single integrated circuit with external connections to connect the analog interface to an external antenna, and the bus interface to an external bus. In accordance with the following approaches multiple NFC front ends on different discrete devices can be controlled by a single host. For example, multiple NFC front ends can be controlled by a shared system controller.

In specific embodiments of the invention, a system will include at least two distinct discrete devices, each with their own NFC controller, where the NFC controllers are controlled by a shared system controller on one of the at least two discrete devices. The shared system controller can be an applications microprocessor such as a Qualcomm Snapdragon microprocessor, a micro-controller, or a custom designed controller ASIC. A system can include a first discrete device having a first NFC controller, a second discrete device having a second NFC controller and a system controller located on the first discrete device. The controllers can be located within the housings of the discrete devices. The shared controller and first NFC controller can be located on a single printed circuit board within the housing of the first discrete device while the second NFC controller is located on a separate printed circuit board within the housing of the second discrete device. As used herein, the term discrete device refers to a physically separate device that can be moved independently of other devices. Furthermore, as used herein, two devices are discrete if they can be operated independently of each other. A peripheral is still discrete from a terminal even if it cannot be operated without a connection to a terminal generally (e.g., the peripheral is still discrete because it can be detached from a given terminal and connected with an alternative terminal of the same class). Discrete devices which do not include the shared system controller and are located remotely from the device which does include the shared system controller can be referred to as remote devices. The shared system controller can control the NFC controllers on the remote devices via a communicative connection between the devices.

In specific embodiments of the invention, a system controller can control at least one NFC controller located on at least one remote device, in addition to an NFC controller collocated on the same discrete device as the system controller, using a communicative connection between the at least one remote device and that discrete device. The communicative connection can be provided by various means. For example, the communicative connection can be provided by one or more wired or wireless connections. In the case of wireless connections, the discrete device and the at least one remote device can include wireless radio to facilitate the communicative connection. The wireless radios can be transceivers for wireless communications of any standard type or frequency band, including such standards as the Wi-Fi/IEEE 802.11 series, EDGE, the EV-Do series, Flash-ODFM, GPRS, the HSPA standards, Lorawan, LTE, RTT, the UMTS series, WiMAX, 6LoWPAN, the Bluetooth series, IEEE 802.15.4-2006, Thread, UWB, Wireless USB, ZigBee, ANT+, and other standards. In the case of wired connections, the communicative connection can include a tether connecting one or more discrete device. Messages can be sent along the wired connection using any form of wired communication including serial peripheral interface (SPI), inter-integrated circuit ($I^2C$), universal serial bus (USB), peripheral component interconnect or PCIE, mobile industry processor interface (MIPI), ethernet, Recommended Standard (RS) (e.g., RS-23), or any other wireless standard. Combinations of these standards are also possible as the communicative connection can include intra-device routing and inter-device routing using different media and protocols. The communicative connection can include a first port on the discrete device on which the shared controller is located and a second port on a remote discrete device. The ports can be external ports exposed by the housing of the discrete device. The ports can be USB, USB-B, USB-C, Thunderbolt, Lighting, or HDMI ports. A single wire, such as a single USB tether, can connect the first port to the second port and facilitate the communicative connection. In the case of a system with two discrete devices, the wired or wireless connection can be a direct connection that does not include connections to any other devices or intermediary routing elements.

In specific embodiments of the invention, the systems disclosed herein can include one or more displays located on the discrete devices. For example, a discrete device which included the system controller described herein could include a display and/or one or more remote discrete devices could include a display. This display could be a cathode ray tube display, a vacuum florescent display, a liquid crystal display, an inorganic or organic light emitting diode display, e-ink display, or any other type of display device, with or without touch screen capability. In specific embodiments of the invention, the discrete device which includes the system controller, will include a display which is controlled by the system controller via a display driver. In specific embodiments of the invention, the one or more remote devices will include a display which is controlled by the system controller. The remote display can be controlled by the system controller in various approaches as described below, particularly with reference to FIG. 4.

In specific embodiments of the invention, the systems disclosed herein can activate one or more NFC antennas on the one or more discrete devices based on what is displayed on one or more displays. For example, a remote device could include an NFC antenna and a display which are both under the control of a system controller. The system controller could include the capability to determine what was being displayed on the remote display and send a signal to the accompanying remote NFC front end to activate or deactivate the NFC antenna based on what was being displayed. In specific embodiments, the display will be the main way to communicate with a user, such that embodiments in accordance with these approaches provide a convenient way to determine when the antenna should be activated. For example, the display could present an employee login screen which instructed an employee to scan an NFC tag to login, and the NFC antenna designed to collect this information could be activated when this screen was presented. After the employee has logged on, the display could then change to a standard operations screen, and the NFC antenna could be deactivated. Such an approach would save power and prevent the antenna from interfering with other systems (e.g., a touch array located in the display).

Figure 2:
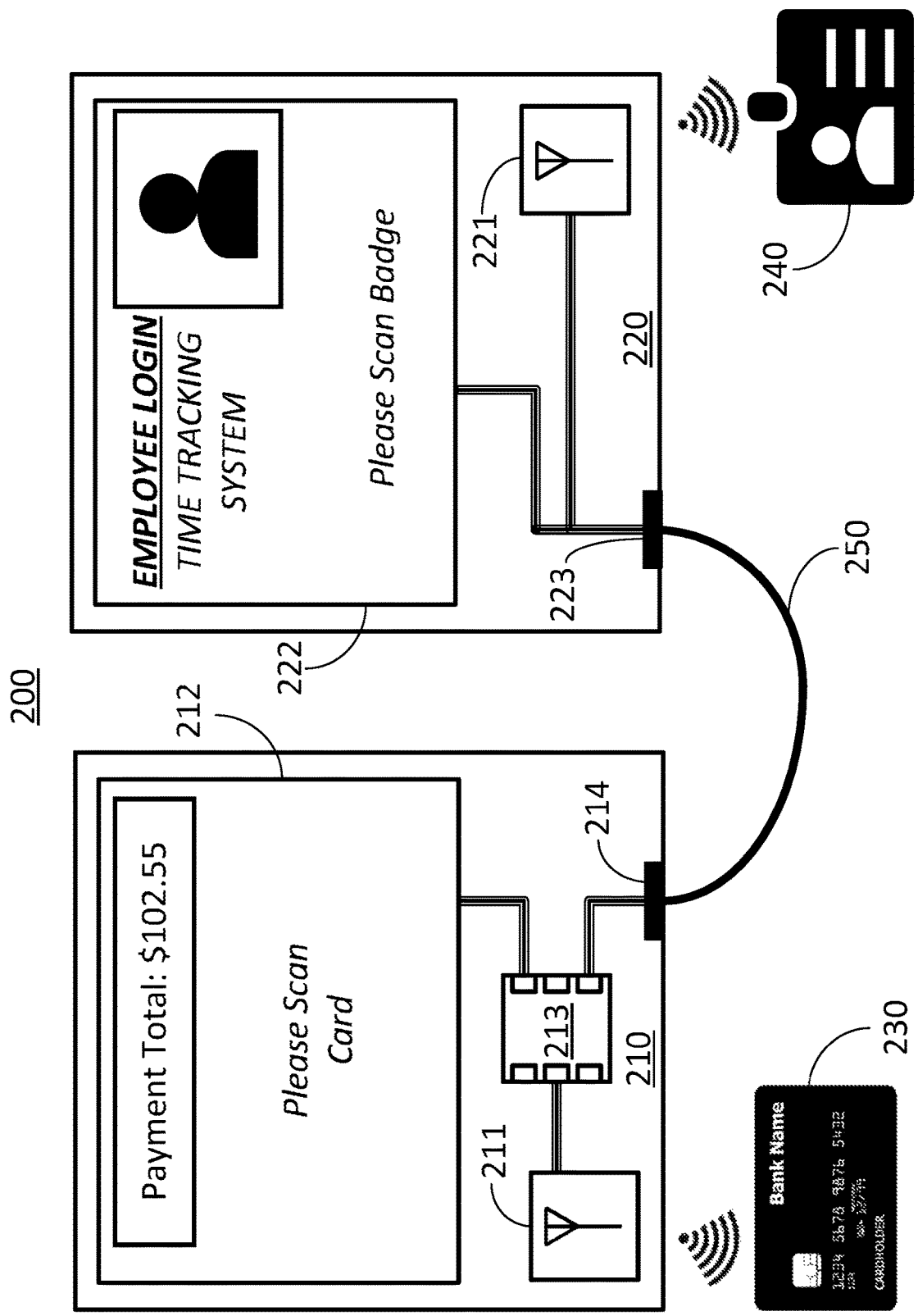
FIG. 2 illustrates a block diagram of two discrete devices that share a single controller for their displays and NFC antennas in accordance with specific embodiments of the inventions disclosed herein.

FIG. 2 includes a block diagram 200 of a system including two discrete devices that share a single controller for their displays and NFC antennas in accordance with specific embodiments of the inventions disclosed herein. The block diagram 200 includes a first discrete device 210 having a first NFC controller 211. The block diagram 200 includes a second discrete device 220 having a second NFC controller 221. In the illustrated approach, the system is a POS system, first discrete device 210 is a customer-facing payment interface device and second discrete device 220 is a merchant-facing peripheral. In this configuration, first discrete device 210 include a first customer-facing touch screen 212 and second discrete device 220 includes a second merchant-facing touch screen 222. Accordingly, both devices appear to be highly functional devices to the merchant and customer: the customer can review transaction information and provide information to the system using touch screen 212 and scan an NFC enabled chip card 230 to provide payment information to the system; and the merchant can review transaction information and provide information to the system using touch screen 222, and can login using an NFC enabled badge 240. However, the merchant-facing peripheral can be a basic device and does not require its own controller. Instead first discrete device 210 includes a system controller 213 that controls display 222 and second NFC controller 221 via a communicative connection. The resulting system provides two highly functional devices at lower cost than would otherwise be required.

System controller 213 controls local devices, such as display 212 and NFC controller 211 via intra-device routing, as well as remote components via a communicative connection that includes wire 250. The wire can be part of a USB cable that connects a first port 214 on first discrete device 210 to a second port 223 on second discrete device 220. Wire 250 facilitates the communicative connection between the devices. However, the communicative connection includes other elements such as intra-device routing on the printed circuit board on which system controller 213 is placed, intra-device wiring from the board to port 214, and similar routing on discrete device 220. In embodiments that are in accordance with FIG. 2, a single tether can be used to route control information for both display 222 and NFC controller 221. In these embodiments, the same communicative connection can be used to route both types of information. However, in other embodiments, control information for a remote display and a remote NFC controller can be routed using separate communicative connections.

In specific embodiments of the invention, a system controller can control a display and an NFC controller, and can send commands to the NFC controller based on what is presented on the display. The controller can be an applications microprocessor or other processing device. The controller can store executable instructions, such as operating system source code stored in random access memory and underlying kernel routines stored in the cache memory of a processor. The executable instructions can include instructions to provide content to the display. For example, the instructions can include usages of the Presentation, Display, View, or Activity classes in the Android operating system that affect what is shown to a user on the display of the device or describe what is shown to the user. The instructions can also include instructions for an application instantiated by the operating system to conduct the same types of actions. The instructions can be translated into low level hardware language for execution by a display driver and transferred to the display driver using a terminal of the processor. Regardless of how the content is delivered to the display, the controller can also store instructions to control an NFC controller based on the content. The same classes mentioned above can be used as triggers for the issuance of the commands necessary to effectuate this control. For example, system controller 213 could include instructions to activate an NFC antenna via NFC controller 221 based on the content that is concurrently being delivered to display 222.

In specific embodiments of the invention, the system controller is application aware and stores executable instructions to activate an NFC antenna via an NFC controller based on a context of an application. As used herein, the term application aware is used in accordance with its standard usage in the industry and refers to the capacity of the controller to be able to optimize application operations in an intelligent way by maintaining certain information about the application. As used herein, the context of the application refers to the intended mode of the application as it relates to its usage by multiple devices (e.g., a merchant context and a customer context in the case of a multi-device system). The system controller can be application aware in that an operating system instantiated by the system controller is application aware. For example, the operating system can include an event listener registered to receive information regarding the context of an application. If the operating system were the Android operating system, the event listener could be registered to receive information regarding an Activity of the application.

In specific embodiments of the invention, the system controller implements the NFC controller interface (NCI) specification or an equivalent specification for interfacing with an NFC controller. The NCI specification describes an interface between an NFC controller and the main processor of an NFC-enabled device. The NCI specification can be implemented by a hardware abstraction layer (HAL) of the operating system where different modules of the HAL are configured to operate with different types of NFC controllers. In embodiments in which the system controller is configured to control at least two NFC controllers, such as a local NFC controller and a remote NFC controller, the controller can include two separate NCI compliant libraries that are accessible to the operating system of the controller. The two libraries can be identical with the exception of minor changes to the names of specific classes, functions or variables (e.g., changes to function names) to avoid conflicts and allow for the libraries to be separately accessed when commonly instantiated. In embodiments in which the controller is application aware, the HAL can be instantiated by the system controller and programmed to send commands to a first local NFC controller and a second NFC controller based on a context of an application. The context of the application can be determined by an event listener registered to monitor the context. The operating system can also be modified to include a helper class that generates messages for the NFC controller such as simple activate or deactivate commands based on the context of the application. In specific embodiments of the invention, the context of the application will be an indication of the content concurrently being delivered to a display.

Figure 3:
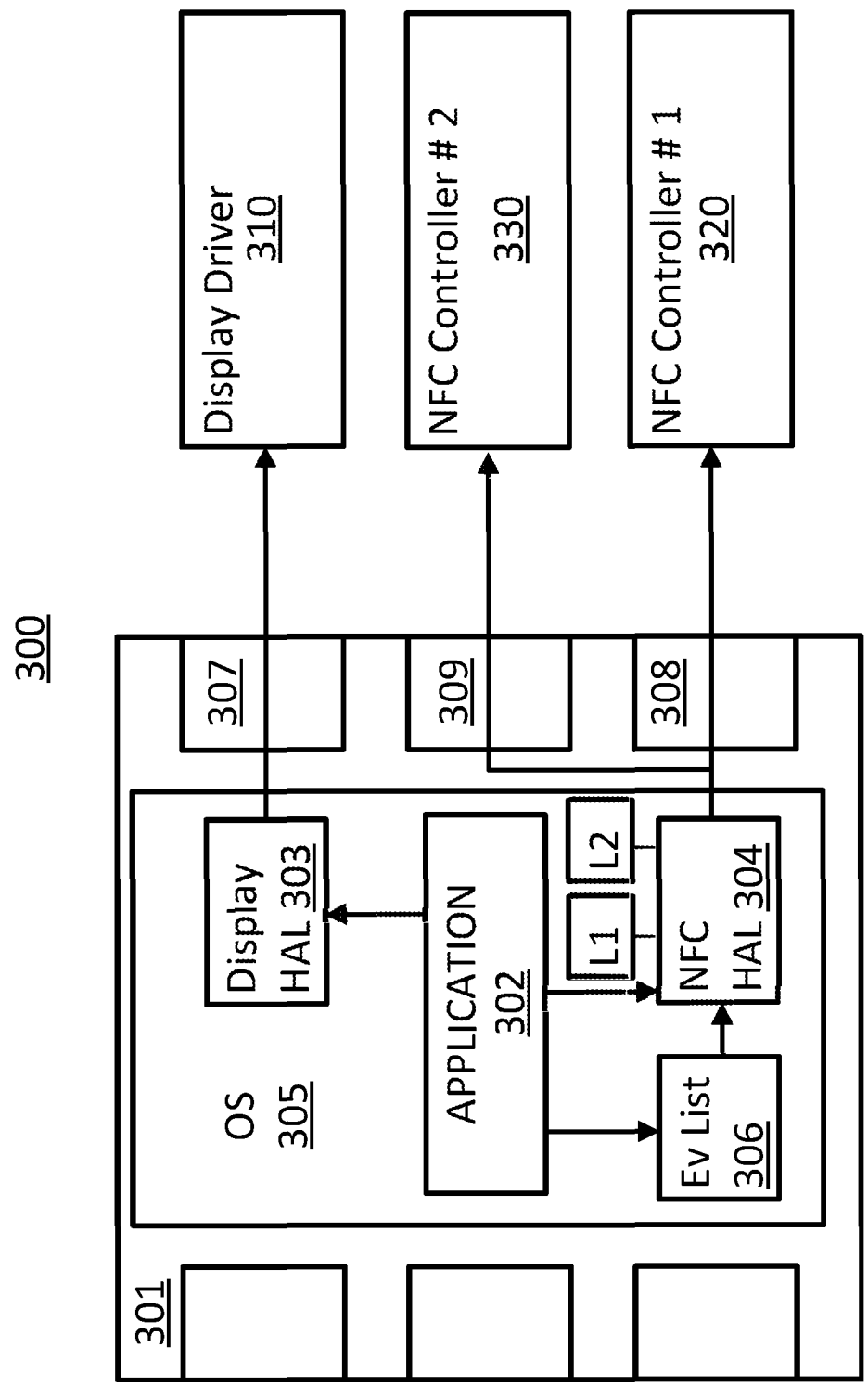
FIG. 3 illustrates a block diagram for a single controller that can be utilized in accordance with specific embodiments of the invention disclosed herein.

FIG. 3 illustrates a block diagram 300 for a controller 301 that can be utilized in accordance with specific embodiments of the invention disclosed herein. Controller 301 is an applications processor with an instantiated operating system 305. The operating system could be iOS, Android, Android Go, Tizen, BlackBerry, Windows Mobile, or other operating systems. As illustrated, the controller is a shared controller as it is used to control a first NFC controller 320 and a second NFC controller 330. Commands from the controller can be translated from the language of the operating system 305 (e.g., JSON content) into lower level hardware commands that can be consumed by the NFC controllers using a HAL 304. HAL 304 can be an NCI compatible NFC HAL. Commands intended for an NFC controller can be transmitted off controller 301 using one or more contacts of the controller 301 such as contact 309 and contact 308. The contacts can be selected based on the protocol used to transmit the commands to the NFC controllers. As illustrated, the controller is also used to provide content to a display. For example, content from application 302 could be translated into lower level hardware commands by a display HAL 303 and transmitted to a display driver 310 via a contact 307 of the controller. For example, the contact 307 could be an HDMI output pin of the controller. In situations in which the display driver 310 is a remote device, a different pin could be used than those situations in which the display driver 310 was used to control a local device.

In accordance with specific embodiments of the invention, controller 301 can be configured to control more than one NFC controller. The HAL of the controller 301 can be programmed, using the source code of the operating system 305, to facilitate that kind of control. In specific embodiments of the invention, the HAL can be the native HAL of the operating system 305 with minor modifications to allow for the control of multiple NFC controllers. As illustrated, NFC HAL 304 is instantiated by the system controller 301 and is programmed to send commands to the first NFC controller 320 and second NFC controller 330. NFC HAL 304 has access to two libraries L1 and L2 for purposes of communicating with the two NFC controllers. Controller 301 has a first NFC library L1 stored on the controller and accessible to the operating system 305, and a second NFC library L2 stored on the controller and accessible to the operating system. The libraries could also be stored on a local memory on the same device, but off the controller, and be loaded into the controller by a BIOS or by the operating system itself. The two libraries can allow the operating system 305 to use the same NFC HAL 304 to control two separate NFC controllers 330 and 320. L1 can be a publicly available NCI compliant library and L2 can be a copy of L1 modified only to prevent conflicts and allow the two libraries to be independently accessed when they are simultaneously instantiated.

In accordance with specific embodiments of the invention, controller 301 can be an application aware controller that controls one or more NFC controllers based on the context of an application, such as application 302, instantiated by an operating system 305 on controller 301. As illustrated, NFC HAL 304 is instantiated by the system controller 301 and is programmed to send commands to the first NFC controller 320 and second NFC controller 330 based on a context of application 302. Application 302 will exhibit certain contexts such as expressed by a Presentation, Display, View, or Activity class affected by application 302. The content associated with that class will accordingly be translated by display HAL 303 and transmitted to display driver 310 via contact 307. Concurrently, an event listener 306, or a helper class, can be informed of the context of the activity (e.g., the current Activity of the application 302), and use that information to determine whether the system should send commands to NFC controller 330 or 320. In specific embodiments of the invention, NFC controller 320 is located locally with controller 301 and is always activated, while NFC controller 330 is located remotely with display driver 310 and is only activated when certain content is provided to display driver 310.

In specific embodiments of the invention, a system controller on a first device can control a remote NFC controller on a remote device by using a communicative connection that includes an accessory hub on the remote device. The accessory hub can be connected to a display and an NFC controller. The accessory hub can be a standard accessory hub augmented with protocol translators. For example, the accessory hub could be a USB accessory hub with protocol translators from USB to other protocols such as $I^2C$, PCI, MIPI, HDMI, etc. depending upon the accessory being controlled. The communicative connection could include protocols nested within other protocols for purposes of accommodating this type of communication. For example, a tether connecting two devices could utilize an $I^2C$ over USB protocol to allow for transport of commands from the system controller to a remote NFC controller with one or more intermittent USB accessory hubs.

Figure 4:
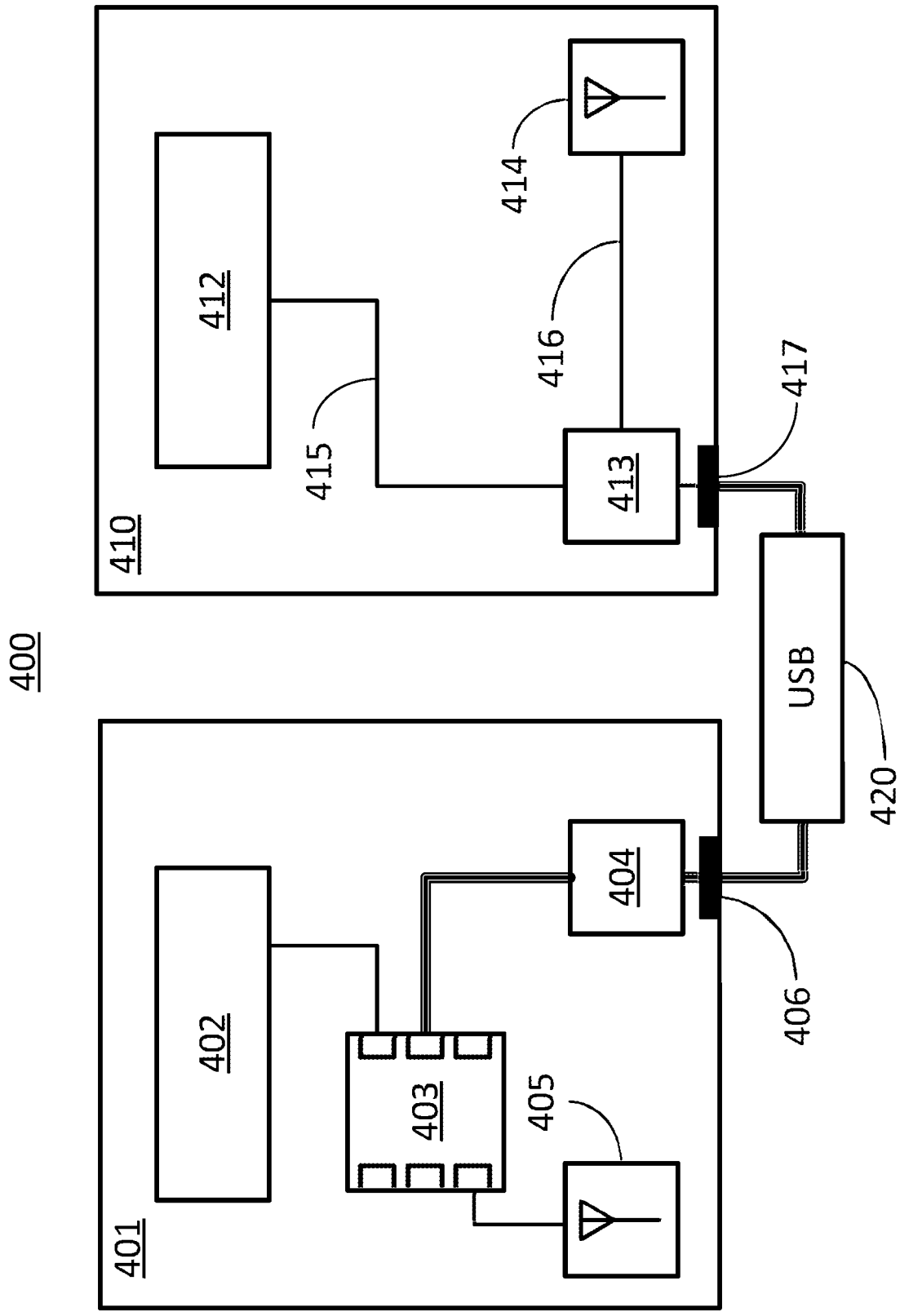
FIG. 4 illustrates a block diagram of an approach for routing display and NFC antenna control data from a first device with a shared controller to a second discrete device in accordance with specific embodiments of the inventions disclosed herein.

FIG. 4 illustrates a block diagram 400 of an approach for routing display and NFC antenna control data from a first device with a shared controller to a second discrete device in accordance with specific embodiments of the invention disclosed herein. Block diagram 400 includes a first discrete device 401 and a second discrete device 410 connected by a communicative connection that includes a tether 420. Device 401 includes a display 402 and an NFC controller 405. Device 410 includes a display 412 and an NFC controller 414. Device 401 includes a system controller 403, and device 410 does not include its own system controller. The components can have the characteristics of the communicative connection, controllers, NFC controllers, and displays described above with reference to FIGS. 2 and 3.

In accordance with specific embodiments of the invention, device 401 includes a first accessories hub 404 located on discrete device 401 and coupled to first port 406 and device 410 includes a second accessories hub 413 located on the second discrete device 410 and coupled to second port 417. As illustrated, the two ports are connected by a tether 420, and the communicative connection from controller 403 to device 410 includes the first accessories hub 404 and the second accessories hub 413. System controller 403 is programmed to control display 412 using an HDMI over USB protocol along tether 420 and accessories hub 413 is configured to translate commands in the HDMI over USB protocol for delivery using HDMI line 415. System controller 403 is programmed to control display 412 using an HDMI over USB protocol along tether 420 and accessories hub 413 is configured to translate commands in the HDMI over USB protocol for delivery using HDMI line 415. System controller 403 is programmed to control NFC controller 414 using an $I^2C$ over USB protocol along tether 420 and accessories hub 413 is configured to translate commands in the $I^2C$ over USB protocol for delivery using $I^2C$ line 416. The connection between accessories hub 404 and controller 403 is a USB line connected to one or more USB contacts on controller 403. The connection between display 402 and controller 403 is on a display port such as an HDMI contact of controller 403. The connection between NFC controller 405 and controller is 403 is an $I^2C$ connection from an $I^2C$ contact of controller 403.

Figure 5:
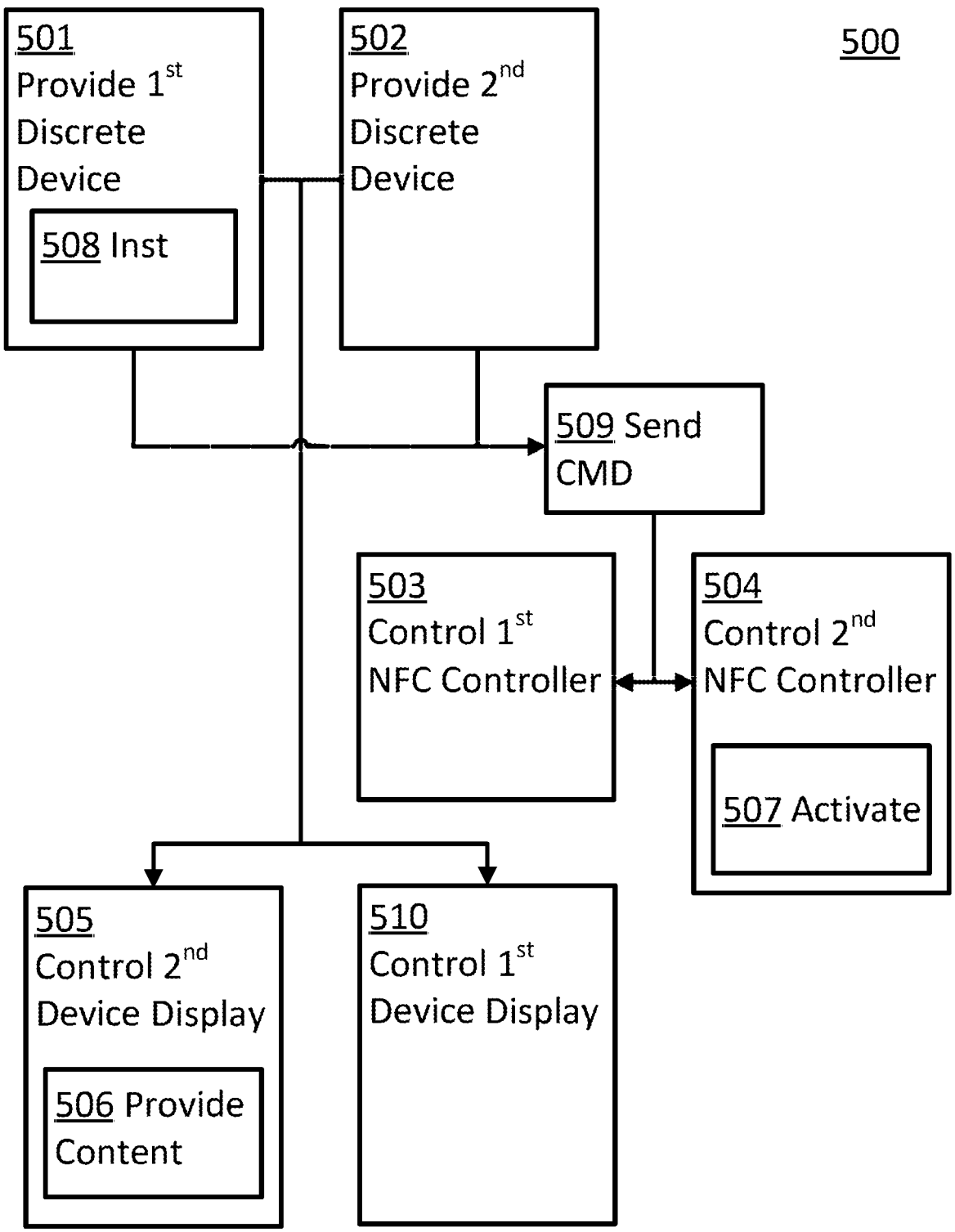
FIG. 5 illustrates a flow chart for a set of methods that can be executed in accordance with specific embodiments of the inventions disclosed herein.

FIG. 5 illustrates a flow chart 500 for a set of methods that can be executed in accordance with specific embodiments of the inventions disclosed herein. The flow chart includes a step 501 of providing a first discrete device having a first NFC controller. The first discrete device can have the characteristics of device 210 described above and utilize a controller in accordance with controller 301 described above. The flow chart also includes a step 502 of providing a second discrete device having a second NFC controller. The flow chart also includes a step 503 of controlling the first NFC controller using a system controller located on the first discrete device. The flow chart also includes a step 504 of controlling, using the system controller and a communicative connection between the first discrete device and the second discrete device, the second NFC controller. The flow chart also includes a step 505 of controlling, using the system controller and a communicative connection between the first discrete device and the second discrete device, a display on the second discrete device. The flow chart also includes a step 510 of controlling, using the system controller, a first display on the first discrete device.

Flow chart 500 also includes sub-steps that are executed in specific embodiments of the invention. Flow chart 500 includes a step 506 of providing content to the second display. This step can be conducted by the system controller on the first discrete device. Flow chart 500 includes a step 507 of activating the second NFC antenna via the second NFC controller based on the content provided to the display in step 506. Flow chart 500 also include a step 508 of instantiating various modules on the first discrete device. The step can be executed by the system controller on the first discrete device. Step 508 can include instantiating an application on the system controller. Step 508 can include instantiating a HAL on a system controller. Steps 503 and 504 can be preceded by a step 509 of sending commands to the first NFC controller and the second NFC controller based on a context of the application instantiated in step 508. The communicative connection used for steps 509, 504, 507, 505, and 506 can include a first accessories hub located on the first discrete device and a second accessories hub located on the second discrete device.

In specific embodiments of the invention, the system will be a POS system and will include at least two discrete devices that use the approaches disclosed herein to collaboratively execute a payment flow. Both the first and second devices could include displays which are controlled by the shared system controller which is located internally on one of the devices. Both the first and second devices could include their own NFC controllers which are both controlled by the shared system controller. One of the devices could include an NFC controller which is compatible with both the NFC Forum Reader/Writer specification and the EMVCo L1 NFC specification. The second device could include an NFC controller that is only compatible with the NFC Forum Reader/Writer specification. In specific embodiments, the first discrete device is a customer-facing terminal for a POS system, and the second discrete device is a merchant-facing peripheral for a POS system. In specific embodiments, the first discrete device is a merchant-facing terminal for a POS system. In specific embodiments, the discrete devices disclosed herein are the dual mode payment device and separate connected device disclosed in U.S. patent application Ser. No. 16/046,001 filed on Jul. 26, 2018, which is incorporated by reference herein in its entirety for all purposes, where each device is augmented with an NFC controller which is controlled in accordance with the approaches disclosed herein. In specific embodiments, the discrete devices are the kiosk and payment interface devices disclosed in U.S. patent application Ser. No. 16/523,947 filed on Jul. 26, 2019, which is incorporated by reference herein in its entirety for all purposes, where each device is augmented with an NFC controller which is controlled in accordance with the approaches disclosed herein.

The specific example of discrete devices capable of being used to process NFC tags in an NFC read/write mode and process payments using the EMVCo L1 standard are used throughout this disclosure as a non-limiting example of the approaches that are disclosed herein. However, the approaches disclosed herein can be utilized to provide a system with NFC controllers for multiple communications protocols. Furthermore, the approaches disclosed herein can be utilized for any kind of short range wireless communications technology and radio frequency identification (RFID) communication protocols including ISO/IEC 14443, JIS-X 6319-4, ISO/IEC 18092, EMVCo specifications, any NFC Forum specification (e.g. NFC-A, NFC-B, NFC-F), and any contactless card technology specification generally.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. These and other modifications and variations to the present invention may be practiced by those skilled in the art, without departing from the scope of the present invention, which is more particularly set forth in the appended claims.

What is claimed is:

1. A system comprising:
   a first discrete device having a first near field communication controller;
   a second discrete device having a second near field communication controller and a display, wherein the second discrete device is connected to the first discrete device through a communicative connection;
   a system controller located on the first discrete device and communicatively connected to: (i) the first near field communication controller; and (ii) the second near field communication controller via the communicative connection;
   a first NFC library stored on the first discrete device;
   a second NFC library stored on the first discrete device;
   wherein the system controller controls the first near field communication controller and the second near field communication controller;
   wherein the system controller uses the first NFC library to interface with the first near field communication controller;
   wherein the system controller uses the second NFC library to interface with the second near field communication controller; and
   wherein the system controller controls the second near field communication controller based on a content to be displayed on the display.

2. The system of claim 1, wherein the first discrete device is a customer-facing payment interface device of a point-of-sale system and the second discrete device is a merchant-facing peripheral of the point-of-sale system.

3. The system of claim 1, wherein the first discrete device is a merchant-facing peripheral of a point-of-sale system and the second discrete device is a customer-facing payment interface device of the point-of-sale system.

4. The system of claim 1, wherein the system controller activates a near field communication antenna via the second near field communication controller based on the content.

5. The system of claim 1, wherein the communicative connection between the first discrete device and the second discrete device comprises a universal serial bus cable connected to a first port on the first discrete device and a second port on the second discrete device.

6. The system of claim 5, wherein the communicative connection uses an I2C protocol over the universal serial bus cable.

7. The system of claim 1, wherein the first near field communication controller is compatible with an NFC Forum Reader/Writer specification and an EMVCo L1 NFC specification; and wherein the second near field communication controller is only compatible with the NFC Forum Reader/Writer specification.

8. The system of claim 1, further comprising:
   an application instantiated on the first discrete device; and
   a hardware abstraction layer: (i) instantiated by the system controller; and (ii) programmed to set the first near field communication controller or the second near field communication controller based on a context of the application.

9. A system comprising:
   a first discrete device having a first near field communication controller;
   a second discrete device having a second near field communication controller and connected to the first discrete device through a communicative connection;
   a system controller located on either the first discrete device or the second discrete device and communicatively connected to: (i) the first near field communication controller; and (ii) the second near field communication controller via the communicative connection;
   a first port on the first discrete device;
   a second port on the second discrete device;
   a first accessories hub located on the first discrete device and coupled to the first port; and
   a second accessories hub located on the second discrete device and coupled to the second port,
   wherein the communicative connection provides access to the first accessories hub and the second accessories hub; and
   wherein the system controller is programmed to control both the first discrete device and the second discrete device using the communicative connection.

10. The system of claim 9, wherein the system controller is located on the first discrete device, wherein the first discrete device further comprises an NFC library stored thereon and accessible to the system controller, and wherein the system controller interfaces with the second near field communication controller using the NFC library.

11. The system of claim 9, wherein the communicative connection between the first discrete device and the second discrete device comprises a universal serial bus cable connected to the first port on the first discrete device and the second port on the second discrete device.

12. The system of claim 11, wherein the communicative connection uses an I2C protocol over the universal serial bus cable.

13. The system of claim 9, wherein the first discrete device is a customer-facing payment interface device of a point-of-sale system and the second discrete device is a merchant-facing peripheral of the point-of-sale system.

14. The system of claim 9, wherein the first discrete device is a merchant-facing peripheral of a point-of-sale system and the second discrete device is a customer-facing payment interface device of the point-of-sale system.

15. The system of claim 9, wherein the system controller is located on the first discrete device, wherein the second discrete device comprises a display, and wherein the system controller controls the second near field communication controller based on a content to be displayed on the display.

16. The system of claim 15, wherein the system controller activates a near field communication antenna via the second near field communication controller based on the content.

17. The system of claim 9, wherein the first near field communication controller is compatible with an NFC Forum Reader/Writer specification and an EMVCo L1 NFC specification; and wherein the second near field communication controller is only compatible with the NFC Forum Reader/Writer specification.

18. The system of claim 9, further comprising:
   an application instantiated on the first discrete device; and
   a hardware abstraction layer: (i) instantiated by the system controller; and (ii) programmed to set the first near field communication controller or the second near field communication controller based on a context of the application.

* * * * *